July 9, 1935.  E. G. K. ANDERSON ET AL  2,007,357
COUPLING FOR CONDUCTORS AND CONDUITS THEREFOR
Filed Feb. 23, 1933
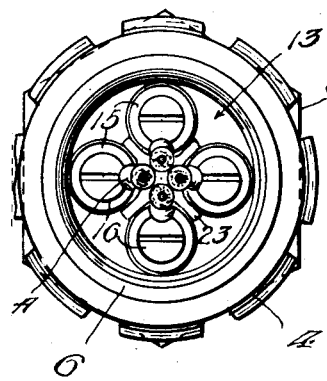
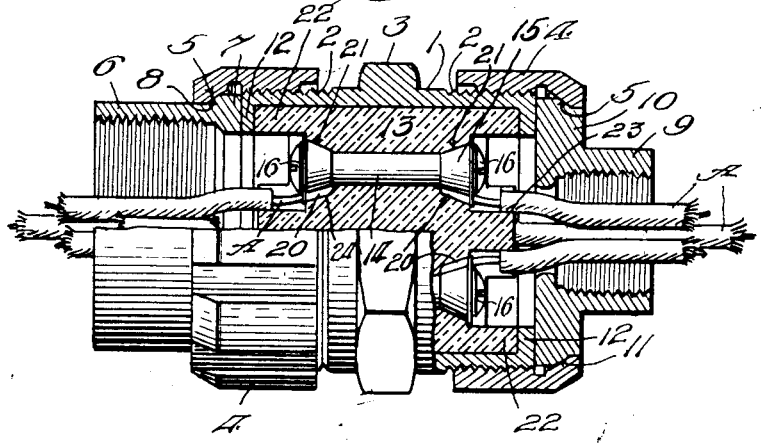
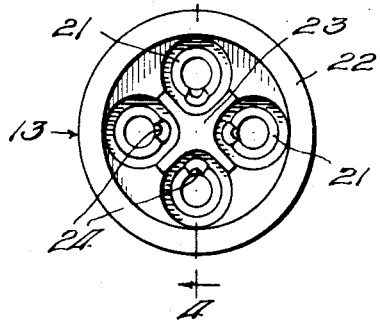
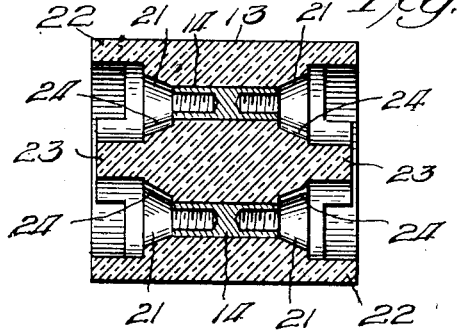
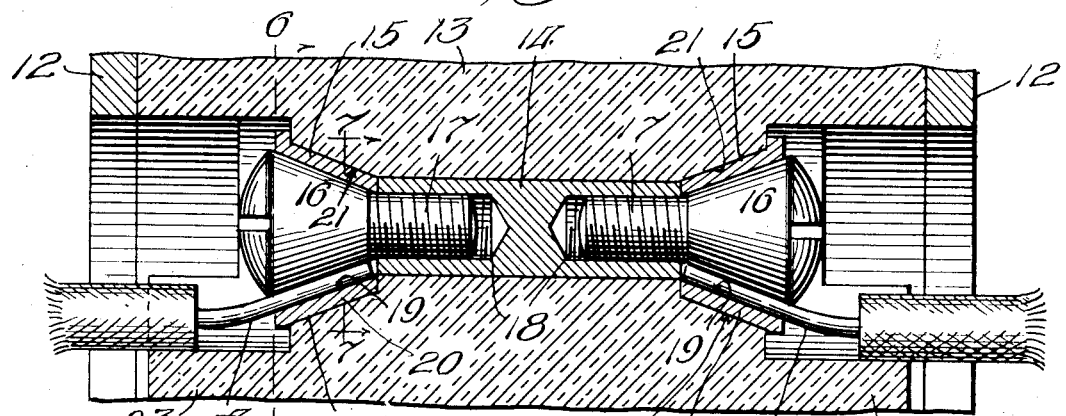
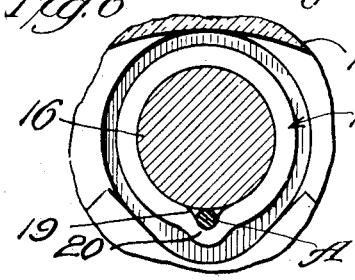

Patented July 9, 1935

2,007,357

UNITED STATES PATENT OFFICE 2,007,357

COUPLING FOR CONDUCTORS AND CONDUITS THEREFOR

Ernst G. K. Anderson, Evanston, and Carl O. Akerlund, Chicago, Ill., assignors to Appleton Electric Company, a corporation of Illinois Application February 23, 1933, Serial No. 657,952

5 Claims. (Cl. 173—268)

In some wiring systems, in which the wires or conductors are housed in pipes, it is necessary to provide sealing means in the pipes between switches or other devices at which an arc or spark might be formed and cause an ignition of gases in the piping, and thereby prevent the flame from spreading. The object of the present invention is to make it possible to form such a seal in a simple and effective manner.

In carrying out the present invention a sealing element is employed that serves also as a coupling or connection between the meeting ends of two pipes or conduits. Viewed in one of its aspects the present invention may be said to have for its object to produce a simple and novel pipe coupling which will effectively shut off communication between two pipes or conduits coupled together thereby and which will provide electrically conductive continuity for the wires or conductors housed in such pipes or conduits.

The various features of novelty whereby our invention is characterized will hereinafter be pointed out with particularity in the claims; but, for a full understanding of the invention and of its objects and advantages, reference may be had to the following detailed description taken in connection with the accompanying drawing, wherein:

Figure 1 is an end view of a coupling embodying the present invention, showing wires or conductors connected thereto; Fig. 2 is a view of the coupling, partly in side elevation, and partly in central longitudinal section, including two sets of conductors or wires connected together by the coupling; Fig. 3 is an end view of the block of insulating material forming part of the coupling; Fig. 4 is a section on line 4—4 of Fig. 3; Fig. 5 is a longitudinal section, on a much larger scale, through the coupling, showing only a fragment thereof; and Figs. 6 and 7 are sections taken, respectively, on line 6—6 and line 7—7 of Fig. 5.

Referring to the drawing, I represents a sleeve, externally screw-threaded at both ends, as indicated at 2, 2, and having a part 3 midway between the ends to receive a wrench. The part 3 may be simply an enlargement of the sleeve to give it a hexagonal configuration. Screwed upon the ends of the sleeve are sleeve nuts 4, 4. Each sleeve nut is adapted to secure to the corresponding end of the member I a suitable coupling sleeve to which an end of a pipe or conduit may be screwed. It is evident that these coupling sleeves constitute adapters so that, by selecting the proper sleeves, pipes or conduits of any desired diameters, within limits, may be coupled together. Furthermore, the two pipes or conduits that are coupled together need not be of the same diameter. Each sleeve nut has at its outer end a bore of frusto-conical shape, the smaller diameter of this bore being at the outer end and being preferably smaller than the diameter of the screw-threaded part. This frusto-conical bore, of course, provides a frusto-conical seat 5 which, when cooperating with a complementary seat on an adapter of coupling sleeve, serves to clamp the latter firmly against the end of the member I, when the sleeve nut is tightened.

In the drawing we have illustrated one of the coupling sleeves 6 having an external diameter approximately as great as the smallest diameter of the frusto-conical bore in the sleeve nut. The coupling sleeve is enlarged in diameter at its inner end, as indicated at 7; this enlarged part having an inclined annular face 8 complementary to the frusto-conical face 5 on the sleeve nut. The other coupling sleeve 9 is shown as being small in diameter. The enlarged part 10 at the inner end is in the form of a thick flange of such diameter that the annular frusto-conical face 11 thereon is similar to the frusto-conical face 8 on the other coupling sleeve, being complementary to the face or seat 5 in the sleeve nut.

The parts that have heretofore been described constitute a coupling for pipes or conduits and we employ them also as a casing or housing for devices serving both as means effectively to shut off communication between the two pipes or conduits and as means to connect together wires or conductors running through such pipes or conduits.

The sealing means and the connecting means for the wires may be carried entirely by the tubular coupling member I which serves also as a casing or housing. In the arrangement shown, the member I has at the ends thereof inwardly extending annular flanges 12, 12. These flanges serve positively to hold in place a block 13 of insulation that fills the bore of the tubular coupling member I. The material of which this insulating block is made is preferably of a type that may be molded and which, as it cools or sets, will remain a tight fit within the surrounding sheathing or casing. Thus the insulating material may be hard rubber or a phenol condensation product of the type known as Bakelite. However, we do not wish to limit ourselves to any particular insulating material.

Embedded in, and extending lengthwise through the block of insulating material, are one or more members 14 of conducting material; the number of these members depending upon the number of wires that are to be coupled together. In the arrangement shown, there are four of these members, whereby four wires may be coupled; and the detailed description will be confined to this particular arrangement. The members 14 are preferably metal bars molded in the block and provided at their ends with suitable terminals for the attachment of wires thereto. In the arrangement shown, each terminal consists of a frusto-conical sleeve 15 the external diameter of the small end of which is about equal to the external diameter of the round bar material of which the members 14 are made, together with a screw having a conical head 16 and a stem 17 entered in an internally screw-threaded bore 18 in the corresponding end of the member 14. The sleeve 15 is deformed so as to produce a longitudinal internal trough or groove 19 opening out of the bore thereof; this deformation consisting in swaging or pressing the metal of the sleeve outwardly along a longitudinal line and thus producing an external rib or key 20, as well as the internal groove or trough. To connect a wire A to one of the members 14 an end thereof is inserted in the trough of the corresponding element 15, after the screw has been loosened, and then the screw is tightened, clamping the wire in the trough.

The bars 14 are much shorter than the insulating block, terminating at the inner ends of frusto-conical recesses 21 into which the sleeve-like receptacles or elements 15 are adapted to be seated. The ends of the block preferably extend outwardly beyond the recesses or cavities 21, conveniently in the form of thick annular flanges or rims 22, 22 which abut against the flanges 12 of the casing or shell 1. Furthermore, within the large space or cavity bounded by each of the flanges 22 we place a suitable projecting web or rib which, in the arrangement shown, takes the form of a cross 23 having arms of equal length; the cross-shaped element at each end of the block being so disposed that the arms thereof extend into the spaces between the cavities 21. Each of the cavities 21 has a groove or channel 24 opening out of the same on the side nearest the center of the block, and extending throughout the length of the cavity. Each such groove or depression is adapted to receive the rib 20 on the corresponding terminal member 15 and hold that member against turning while the screw is being tightened or loosened.

It will be seen that, when the wires are connected to the terminals of the block, those at each end will naturally converge toward each other because the four grooves in which the ends of the wires lie converge toward each other. The cross-shaped partition piece 23, however, keeps the four wires from coming in contact with each other in regions where the insulation has been removed or perhaps mutilated. The advantage of having the wires converge toward each other as they recede from the terminals is that they are thus caused to be bunched together as they pass out through the adapters or coupling members 6 and 9; and, in the case of an adapter such as the adapter 9 for connection with a small pipe, are prevented from rubbing against the interior of the contracted part or part of reduced diameter of the adapter, as they otherwise would.

It will be seen that, in applying the coupling to pipes or conduits containing conductors, it is a simple matter to connect the conductors to the terminals of the body member of the coupling, and then to connect the pipes or conduits. In making the pipe or conduit connection, the adapters are screwed upon the ends of the pipes before the wires are coupled together. In order to connect either pipe to the body member of the coupling device the latter is held by its tubular metal shell or cage while the sleeve nut on the adapter that has been fastened to that pipe is screwed on the end of said body member. Consequently, no stresses are imposed on the insulating material in the body member of the coupling, or on the connections of the wires to the terminals, at the time of making the mechanical coupling or connection between the pipes or conduits, and therefore there is no danger of disturbing or injuring the connections between the two sets of wires.

While we have illustrated and described with particularity only a single preferred form of our invention, we do not desire to be limited to the exact structural details thus illustrated and described; but intend to cover all forms and arrangements which come within the definitions of the invention constituting the appended claims.

We claim:

1. In a coupling, a block of insulating material having a frusto-conical cavity in each end, a conductor extending through said block from one of said cavities to the other, a frusto-conical metal sleeve fitting in each cavity, and a screw extending through each sleeve into said conductor, each screw having a frusto-conical head fitting the surrounding sleeve.

2. In a coupling, a block of insulating material having a frusto-conical cavity in each end, a conductor extending through said block from one of said cavities to the other, a frusto-conical metal sleeve fitting in each cavity, each sleeve having a trough or channel opening out of the bore thereof and extending lengthwise of the same to receive a wire end, and a screw extending through each sleeve into said conductor, each screw having a frusto-conical head fitting the surrounding sleeve.

3. In a coupling, a block of insulating material having in each end a frusto-conical cavity provided with a channel extending lengthwise thereof opening out from one side thereof, a conductor extending through said block from one cavity to the other, a frusto-conical metal sleeve in each cavity having a longitudinal trough-shaped rib entered in the trough or channel of the cavity and adapted to receive a wire end in the trough thereof, and a screw extending axially through each sleeve into said conductor and having a frusto-conical head fitting into said sleeve.

4. In a coupling, a block of insulating material having a plurality of frusto-conical cavities in each end, conductors extending continuously through said block between corresponding cavities, a frusto-conical metal sleeve in each cavity, each sleeve having a longitudinal groove or channel opening out of the bore thereof to receive a wire end, cooperating elements on the block and sleeves to cause the sleeves to position themselves so as to place the grooves or channels on the sides nearest the center of the block, and screws extending through said sleeves into said conductors, said screws having frusto-conical heads fitting into said sleeves and adapted to clamp wire ends disposed in the channels in the sleeves.

5. In a coupling, a block of insulating material having a frusto-conical cavity in each end, a conductor of considerable cross sectional area extending continuously through said block from one of said cavities to the other, a frusto-conical metal sleeve fitting in each cavity, each sleeve having a trough or channel opening out of the bore thereof and extending lengthwise of the same to receive a wire end, said cavities having grooves opening out thereof to receive said troughs, and a screw extending through each sleeve into said conductor, each screw having a frusto-conical head fitting the surrounding sleeve.

ERNST G. K. ANDERSON.
CARL O. AKERLUND.